United States Patent Office 3,094,503
Patented June 18, 1963

3,094,503
PHTHALATES OF A MIXTURE OF NORMAL 6, 8 AND 10 CARBON PRIMARY ALCOHOLS AND VINYL CHLORIDE POLYMERS PLASTICIZED THEREWITH
Claud L. Jacocks, Ponca City, Okla., and George E. Hinds, Houston, Tex., assignors to Continental Oil Company, Ponca City, Okla., a corporation of Delaware
No Drawing. Filed July 25, 1960, Ser. No. 44,899
4 Claims. (Cl. 260—31.8)

This invention relates to a novel plasticizer and, more particularly, it pertains to a plasticizer which is especially adapted for use in a polyvinyl resin.

The alkyl esters of phthalic acid are useful as plasticizers in resins such as the polyvinyl polymers. The properties of the resinous material are improved by the addition of the plasticizer and it is possible, by varying the relative proportions of the same, to procure improved properties as to flexibility, elasticity, pliability, tensile strength, and the like. The ability of the plasticized resin to retain such improved properties depends, at least in part, upon the volatility of the plasticizer which is employed. As might be expected, with the loss of plasticizer, the desirable properties of the resin may be either lost or substantially diminished, to the extent that the plastic material may no longer be useful for the purpose intended. Consequently, the volatility of the plasticizer is an important property and, in many situations, it is determinative of whether or not a particular type of plasticizer is to be used.

As a class, the dialkyl phthalates exhibit wide differences as to volatility when incorporated into the resin. In general, heretofore, it has been recognized that the volatility of a plasticizer will increase as the length of the alkyl esterifying groups is decreased. From this rule, it has been the practice to employ an alkyl phthalate which has alkyl substituents of the greatest number of carbon atoms which is possible, and yet to be consistent with the procurement of desirable properties in the plasticizer resin. Quite unexpectedly, we have discovered, contrary to the present trend, that the rule of volatility of the dialkyl phthalates does not apply in certain situations. As a matter of fact, we have discovered that, for certain types of dialkyl phthalates, the volatility is unexpectedly lower than in those plasticizers which are used conventionally for plasticizing resinous materials.

Therefore, an object of this invention is to provide a novel plasticizer of the phthalate ester type.

Another object of this invention is to provide a novel phthalate ester type plasticizer which is especially adapted for use in ployvinyl resins.

Other objects and advantages of this invention will become apparent from the following description and explanation thereof.

In accordance with the present invention, the plasticizer comprises a mixture of phthalate esters containing alkyl esterifying groups in the amount of about 15 to 30 percent by weight of a normal alkyl group of $C_6$ atoms, about 30 to 40 percent by weight of a normal alkyl group of $C_8$ atoms, and about 40 to 50 percent of a normal alkyl group containing $C_{10}$ atoms, based on the total mixture. Quite unexpectedly, the mixture of phthalate esters was found to give superior results with respect to volatility loss and low temperature flexibility when incorporated into a resinous material such as, for example, a polyvinyl resin. Another surprising effect is that the various alkyl substituents which are present in the mixture of phthalate esters synergize or cooperate to give a volatility loss which is less than would be expected on the basis of the individual effects of such substituents. In addition to the unusual effects mentioned above, the mixture of phthalate esters exhibits superior characteristics when incorporated in a resinous material, with respect to the bent strip compatibility test, heat stability, extractability with gasoline, mineral oil and soapy water, tensile strength, elongation and other properties.

The surprising features of the mixture of phthalate esters is that the presence of an alkyl esterifying group of 6 carbon atoms does not adversely influence the volatility characteristics of the resultant mixture. In general, a phthalate ester containing alkyl substituents of 6 carbon atoms would be too volatile for most commercial application. As to phthalate esters containing alkyl groups of 8 carbon atoms, at present widespread use is being made of such materials as plasticizers because of their relatively low volatility and favorable plasticizing effects. The phthalate esters containing alkyl groups of 10 carbon atoms are even less volatile than the phthalates containing alkyl groups of 6 or 8 carbon atoms, but other properties are not as favorable as is desired for commercial application. Consequently, there was no basis upon which it could be predicted that a combination of alkyl substituents of 6 to 8 carbon atoms would synergize to give a mixture of esters having especially low volatility.

The mixture of phthalate esters is prepared by combining phthalic acid or phthalic anhydride with a stoichiometric excess of each of n-hexanol, n-octanol and n-decanol. For this purpose, about 0.5 to 1.5 moles of n-hexanol, about 0.5 to 2.5 moles of n-octanol, and about 0.75 to 2.5 moles of n-decanol are combined with 1 to 3 moles of phthalic anhydride or phthalic acid. The reaction may take place at a temperature of about 90° C. to 110° C., and at atmospheric pressure. The time of reaction is governed by the length of time required to esterify all of the acid or anhydride which is present in the reaction mass, and the extent of esterification is governed by the rate of removal of water which is the by-product of the reaction. Consequently, the time of reaction may vary considerably. However, in general, about 2 hours to 4 hours is required. To facilitate the reaction, a suitable organic solvent may be employed. For this purpose, various aromatic hydrocarbons, such as benzene, toluene, xylene, cumene, etc., may be employed. All the organic solvents have in common the characteristic that they are non-reactive with either the reactant or the ester product and are preferably immiscible with water. The organic solvent provides a medium in which the acid and alcohol are reacted and enables the reaction to be maintained at a temperature below the level at which the reactants or esters boil, but above the temperature at which water boils, in order that water can be removed continuusly from the reaction mass during the course of the reaction. Esterification is an equilibrium reaction. Consequently, it is beneficial to remove water from the reaction as the reaction is proceeding. As to the organic solvent, in view of the above considerations, it has a boiling point which is less than the boiling point of the reactants and the product obtained therefrom. Generally, the organic solvent has a boiling point which is about 100° C. to 150° C. less than the boiling point of any of the reactants and ester product. In order to initiate the reaction, a small quantity of concentrated sulfuric acid may be incorporated into the reaction mass in an amount about 0.20 percent to 0.25 percent, based on the weight of the phthalic acid or phthalic anhydride.

After the esterification reaction has been completed, the recovery of the ester material may be effected by first passing the same over a dehydrating agent such as calcium chloride, activated alumina and the like. Thereafter, the organic solvent with or without the unreacted alcohols, if any, is removed from the reaction mass by distillation. The remainder of the reaction mass, consisting of esters and possibly unreacted alcohols, is subjected to a separation treatment, preferably by distillation under vacuum, for the recovery of the ester product. The mixture of esters may be treated with a decolorizing agent, such as, for example, Attapulgus clay. Another method of separating the ester product is to first wash the reaction product with water and with 5 percent aqueous sodium carbonate. The reaction product is then dried by means of anhydrous sodium sulfate. The organic solvent is removed from the dried product by distillation and then the remainder of the reaction product is subjected to a separation treatment, such as by distillation under vacuum to produce the ester product.

The reaction of phthalate esters of the present invention is incorporated into a resinous material in an amount of 50 percent to 100 percent, based on the weight of the polymer. A variety of resinous materials can be plasticized by means of a mixture of phthalate esters with beneficial results. Specific examples of the resins to which the plasticizer may be added are: nitrocellulose, polyacrylates, cellulose acetate, vinylpolymers, etc. Among the various resinous materials which can be improved by the addition of the plasticizer of this invention, the vinyl polymers show the greatest improvement as to the various properties discussed hereinafter. Specific examples of the vinyl polymers are polyvinyl acetate, polyvinyl chloride-acetate, polyvinyl butyral, etc. Polyvinyl chloride shows the greatest improvement in properties from the addition of the plasticizer of this invention.

It is also contemplated using other adjuvants in the resinous material along with the plasticizer of present invention. In this connection, stabilizers, such as the cadmium or barium salts of carboxylic acids, epoxy compounds, etc., may be included in the resinous material. From the investigations made of the effects of the plasticizer of this invention on the resinous material, it was found that no harmful effect is produced by the additional presence of other conventional adjuvants.

In order to provide a fuller understanding of the present invention, reference will be had to the following specific examples thereof. The esters which were evaluated for the purpose of the present invention were prepared by the following method: 3 moles of phthalic anhydride, 1500 ml. of toluene, and varying quantities of n-hexanol, n-octanol, and n-decanol or other alcohols, using 10 percent in excess of the stoichiometric amount, and 1 ml. of concentrated sulfuric acid were placed in a 5-liter, 3-necked flask provided with a stirrer, reflux condenser, and a Dean Stark azeotrope trap. The flask was heated and refluxed with stirring until the calculated amount of water was collected in the trap. The flask was cooled and the crude reaction mixture was divided into two equal parts and treated as follows:

(a) The reaction mass was passed through an absorption column containing 150 grams of activated alumina. Thereafter, toluene was removed from the reaction mass by distillation at a temperature of 245° C. and a pressure of 3.5 mm. Hg. By this distillation, any excess of alcohol was also removed. The flask was cooled and the esters were stirred for 30 minutes at a temperature of 50° C. with 15 grams of Attapulgus clay.

(b) The reaction mixture was transferred to a separatory funnel, washed with water, 5 percent aqueous solution of sodium carbonate, with water again, and then dried over anhydrous sodium sulfate. The toluene solvent was removed by distillation and the crude ester product was distilled in vaccum at a pressure of 2.7–3.0 mm. Hg.

In the following table are contained the esters which were employed in the evaluation to be discussed hereinafter:

Table I

| Example No. | Ester Identification | Percent |
|---|---|---|
| 1 | Di-octyl phthalate | |
| 2 | N-octyl-n-decyl phthalate | |
| 3 | Phthalates of: | |
| | n-heptanol + 2-methyl-hexanol-1 | 45 |
| | n-octanol + 2-methyl-heptanol-1 | 43 |
| | n-nonanol + 2-methyl octanol-1 | 12 |
| 4 | Phthalates of: | |
| | n-hexanol | 20 |
| | n-octanol | 35 |
| | n-decanol | 44 |
| | n-dodecanol | 1 |
| 5 | Phthalates of: | |
| | n-hexanol | 20 |
| | n-octanol | 35 |
| | n-decanol | 45 |
| 6 [1] | Phthalates of: | |
| | n-hexanol | 20 |
| | n-octanol | 35 |
| | n-decanol | 44 |
| | n-dodecanol | 1 |
| 7 | Di-n-hexylphthalate | |

[1] Prepared by first esterifying phthalic anhydride with all the n-hexanol and then finishing the esterification by the addition of the remainder of the alcohols.

The percent volatility loss of plasticizers from samples of polyvinyl chloride resin were determined in accordance with the procedure ASTM D–1203–55 entitled "Volatility Loss From Plastic Materials." The volatility loss of the esters given in Table I above in polyvinyl chloride resin were determined and are reported in Table II which follows.

Table II

| Example No.: | Percent volatility loss |
|---|---|
| 1 | 3.25 |
| 2 | 3.15 |
| 3 | 2.91 |
| 4 | 2.59 |
| 5 | 2.42 |
| 6 | 2.43 |
| 7 | 4.85 |

It will be noted from Table II above that the volatility of di-octyl phthalate is 3.25 and the volatility of di-n-hexyl-phthalate is 4.85. By using the mixed ester, n-octyl-n-decyl, the volatility was reduced slightly to 3.15. However, as seen from Example 5, when the phthalate ester was prepared from alcohols containing 6, 8 and 10 carbon atoms, the percent volatility is reduced significantly, notwithstanding that the ester contains an alkyl group of 6 carbon atoms, which from all indications, should increase significantly the volatility of the plasticizer. Example 4 illustrates that a small percentage of higher alcohol, dodecanol, has no significant adverse effect on the volatile characteristics of the plasticizer. Likewise, Example 6 demonstrates that the initial esterification of hexanol alone has no adverse effect on the volatility characteristics of the plasticizer.

An additional evaluation was made of the various plasticizers in polyvinyl chloride as to the low temperature flexibility of the plasticizer resin. The results obtained are reported in Table III which follows. Procedure employed is described in ASTM D–1043–51.

Table III

| Example No.: | Low flexibility, degrees F. |
|---|---|
| 1 | −46.0 |
| 7 | −51.0 |
| 5 | −58.5 |
| 6 | −56.5 |

From the data given in Table III above, it can be seen that the low temperature flexibility of the plasticizer of this invention is unexpectedly superior over other conventional plasticizers and that the result obtained by having a mixture of phthalate esters is surprisingly superior, in view of the results obtained from esters in which a single alkyl esterifying group is present.

In the following table, a comparison is given between the plasticizer of the present invention and other conventional plasticizers as to the percent extractability by means of soapy water. The procedure employed is described in ASTM D-1239-55.

Table IV

| Example No.: | Percent extractability |
|---|---|
| 1 | 3.63 |
| 2 | 2.80 |
| 3 | 3.59 |
| 7 | 5.74 |
| 5 | 1.66 |

We claim:

1. A plasticizer composition comprising dialkyl phthalates obtained by esterifying phthalic anhydride with a mixture of straight chain alcohols having alkyl esterifying groups in the relative proportions by weight respectively of from about 15 to 30 percent n-hexyl, 30 to 40 percent n-octyl and 40 to 50 percent n-decyl.

2. A resinous composition of matter comprising from about 50 to 67 weight percent of a vinyl polymer selected from the group consisting of polyvinyl chloride and polyvinyl acetate and correspondingly from about 50 to 33 weight percent of dialkyl phthalates obtained by esterifying phthalic anhydride with a mixture of straight chain alcohols having alkyl esterifying groups in the relative proportions by weight respectively of from about 15 to 30 percent n-hexyl, 30 to 40 percent n-octyl and 40 to 50 percent n-decyl.

3. A plasticizer composition comprising dialkyl phthalates obtained by esterifying phthalic anhydride with a mixture of straight chain alcohols having alkyl esterifying groups in the relative proportions by weight respectively of 20 percent n-hexyl, 35 percent n-octyl and 45 percent n-decyl.

4. A resinous composition of matter comprising from about 50 to 67 weight percent of a vinyl polymer selected from the group consisting of polyvinyl chloride and polyvinyl acetate and correspondingly from about 50 to 33 weight percent of dialkyl phthalates obtained by esterifying phthalic anhydride with a mixture of straight chain alcohols having alkyl esterifying groups in the relative proportions by weight respectively of 20 percent n-hexyl, 35 percent n-octyl and 45 percent n-decyl.

References Cited in the file of this patent

UNITED STATES PATENTS

| 1,993,736 | Graves et al. | Mar. 12, 1935 |
| 2,325,951 | Gresham | Aug. 3, 1943 |
| 2,730,513 | Balley et al. | Jan. 10, 1956 |
| 2,862,959 | Patrick et al. | Dec. 2, 1958 |
| 2,936,320 | Benoit | May 10, 1960 |